July 9, 1968

R. H. NILSSON 3,391,762

DEVICE FOR VARYING THE LEVERAGE IN VEHICLE BRAKE
LINKAGE IN DEPENDENCE UPON VEHICLE LOAD

Filed Feb. 10, 1967

INVENTOR
Ragnar Hjalmar Nilsson

BY Watson Cole Grindle + Watson

ATTORNEYS

United States Patent Office 3,391,762
Patented July 9, 1968

3,391,762
DEVICE FOR VARYING THE LEVERAGE IN VEHICLE BRAKE LINKAGE IN DEPENDENCE UPON VEHICLE LOAD
Ragnar Hjalmar Nilsson, Vanasgatan 19, Malmo, Sweden
Filed Feb. 10, 1967, Ser. No. 615,179
Claims priority, application Great Britain, Feb. 14, 1966, 6,463/66
3 Claims. (Cl. 188—195)

ABSTRACT OF THE DISCLOSURE

A leverage control device having a lever engageable in the final stage of the brake application with a displaceable fulcrum and carrying a cam follower engageable with both walls of a slot of a cam, which thereby serves not only to define a rocking axis of the lever in the initial stage of the brake application, but also to restore the lever to rest position upon release of the brakes.

Background of the invention

This invention relates to a device for varying the leverage in a vehicle brake linkage in dependence upon variations in the vehicle load, the device being of the kind comprising a housing, a lever movable within the housing, a cam follower mounted on the lever for engaging a cam mounted within the housing, and a fulcrum movable along a guide in the housing in dependence upon variations in the vehicle load, the arrangement being such that during an initial stage in the application of the brakes the lever rocks about an axis determined by the cam follower in engagement with a cam surface of the cam whereas during a final stage in the application of the brakes the lever rocks upon the said fulcrum.

Hitherto in a device of the kind referred to the return of the said lever to its normal rest position when the brakes are released has required a return force from the linkage outside the housing, but this involves some disadvantages, for example the provision of at least one external return spring.

The invention is therefore intended to provide an improved device of the kind referred to.

Summary of the invention

According to the invention a device of the kind referred to is characterised in that the cam is arranged to act so that when the brakes are released the said lever returns to its normal rest position without requiring a return force to be exerted upon the lever from the linkage outside the housing. Preferably the cam is provided with a surface on which the cam follower moves during the release of the brakes to cause the return of the lever to its rest position. Advantageously the said surface is substantially parallel to a surface of the cam on which the cam follower moves during application of the brakes. In a preferred construction the two said surfaces form opposite sides of a slot in the cam, the slot extending generally in a direction obliquely transverse to the general directions of movements of the ends of the lever.

The device in accordance with the invention may be used in a brake linkage without an external return spring, thus permitting economy in manufacture, greater simplicity in maintenance and reliability in operation and fewer difficulties in designing the linkage for a combined compressed air and vacuum brake system.

Description of the preferred embodiment

Figure 1:
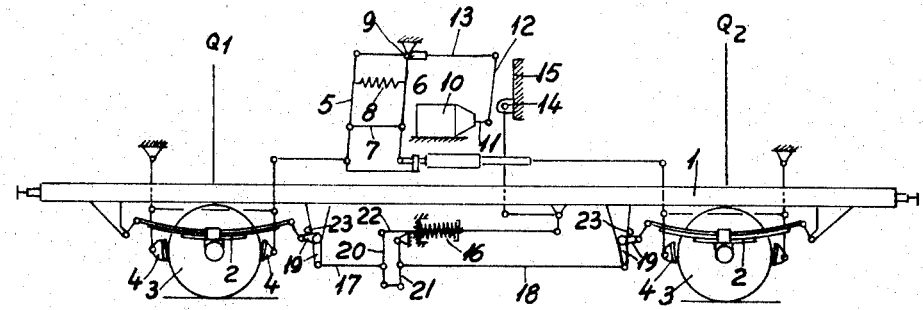
FIGURE 1 is a diagrammatic illustration of a vehicle with a brake linkage and a device of the kind referred to, FIGURE 2 is a diagrammatic sectional view of a known device of the kind referred to, with the parts as at an intermediate stage during release of the brakes and with a return force from the linkage outside the housing.

Referring to FIG. 1, the underframe 1 of a railway vehicle is carried by spring 2 on the axles of the wheels 3. Brake shoes 4 to be applied against the wheels 3 are respectively connected in a conventional manner to a live brake lever 5 and a dead brake lever 6 forming a pair of equalizing levers for the distribution of the braking power to the two sets of wheels of the vehicle. The two equalizing levers 5 and 6 are interconnected by a tie rod 7 and according to general known practice by a conventional spring 8. This spring 8 is shown as a tension spring, but could of course be replaced by another spring or springs arranged in a different way, but having a corresponding effect. The said conventional spring 8 could, however, be dispensed with by the use of a device according to the invention as will be explained below.

The dead brake lever 6 is pivoted at 9 to a rigid part of the underframe 1. A brake cylinder 10 is fixed with respect to the underframe 1 and its piston rod 11 is pivoted to a lever 12 which in turn is pivoted to one end of a push rod 13 the other end of which is pivoted to the live brake lever 5.

The lever 12 is adapted to engage a fulcrum 14 which is displaceable in dependence upon variations in the vehicle load along a fixed track 15. The fulcrum 14 is moved by a control mechanism into a position determined by the load on the wheel axle that carries the smaller portion $Q_1$ of the total weight $Q_1+Q_2$ reposing on the two wheel axles. This control mechanism comprises a spring 16 that is subject to a force which is derived from the said load by means of a system of levers and rods and varies with this load. In the form shown this system of levers and rods comprises two pull rods 17, 18 which are acted upon in dependence upon the loads on the axles at the two ends of the vehicle by means of bellcrank levers 19, two levers 20 and 21 which are tied to each other and are acted upon by the pull rods 17 and 18, and a pull rod 22 acted upon by the lever 20 and loaded by the spring 16. Abutments 23 are arranged in such a manner that one of the levers 19 that is at the more heavily loaded end of the vehicle is supported against its abutment 23 so that the spring 16 will always be loaded only by the one of the two pull rods 17 and 18 that is subject to the smaller force. The displaceable fulcrum 14 is operatively connected with the pull rod 22 so that the position taken by this pull rod 22 will determine the position into which the fulcrum 14 will be moved along the track 15. In practice the linkage is preferably of a known kind in which the leverage is not dependent upon deflections of the vehicle springs so that the linkage requires no adjustments to suit vehicles with springs of different strengths or if the vehicle springs become deformed or aged.

Figure 2:
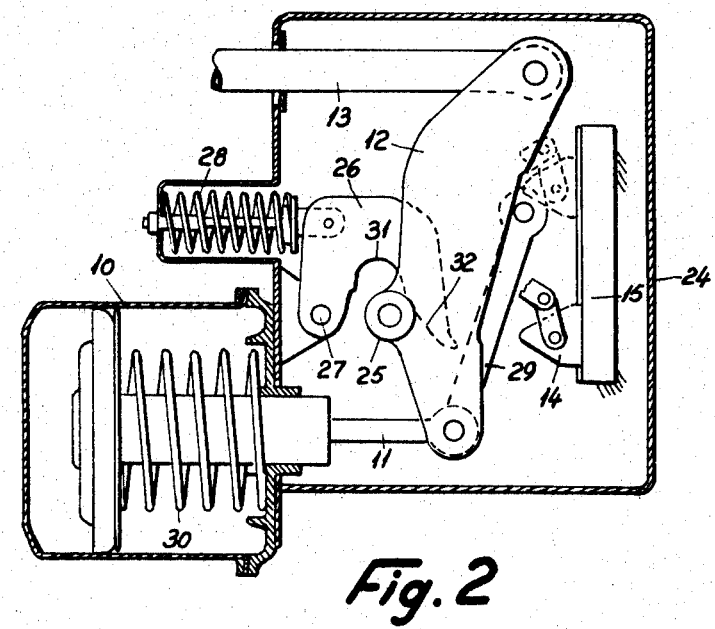

During an initial stage in an application of the brakes the lever 12 is guided so as to establish a predetermined leverage in the brake force transmission. As shown in FIG. 2 the brake cylinder 10 is rigidly connected to a housing 24 in which the track 15 is mounted. The lever 12 carries a cam follower 25 adapted to contact a surface comprising parts 31 and 32 on a cam 26 which is pivoted at 27. A compression spring 28 resiliently resists counterclockwise movements of the cam 26. The mechanism for moving the fulcrum 14 is mostly omitted from FIG. 2. However, the position of the fulcrum 14 shown in full lines is that for determining a lower leverage—corresponding to an empty vehicle—whereas the position of the fulcrum 14 shown in dotted lines is its position for determining a higher leverage—corresponding to the maximum vehicle load.

At its lower end the lever 12 is pivotally connected to the piston rod 11 and furthermore is pivotally connected to the lower end of a link 29 which in turn is pivotally connected at its upper end to the wall of the housing 24. A return compression spring 30 is accommodated in the cylinder 10 to act upon the piston and the piston rod 11. The surface of the cam 26 adapted to engage the cam follower during application of the brakes compreses a semi-circular part 31 and a substantially flat part 32.

The device illustrated in FIG. 2 is known and is of the kind referred to and will operate as follows.

During the application of the brakes the piston rod 11 will be expelled and thus cause the lower end of the lever 12 to follow a circular path defined by the link 29. The upper end of the lever 12 and thus also the push rod 13 will be moved towards the left, the leverage during an initial stage being determined by the contact between the cam follower 25 and the cam 26.

The cam follower 25 will move downwards along the cam 26 and eventually it will pass under the cam 26. The lever 12 will then contact the fulcrum 14, and during the remaining part of the brake application the leverage will be defined by the position of the fulcrum 14. As will be understood from FIG. 1, the position of the fulcrum 14 is a function of the load on that vehicle axle which carries the smaller portion $Q_1$ of the total load $Q_1+Q_2$.

Figure 3:
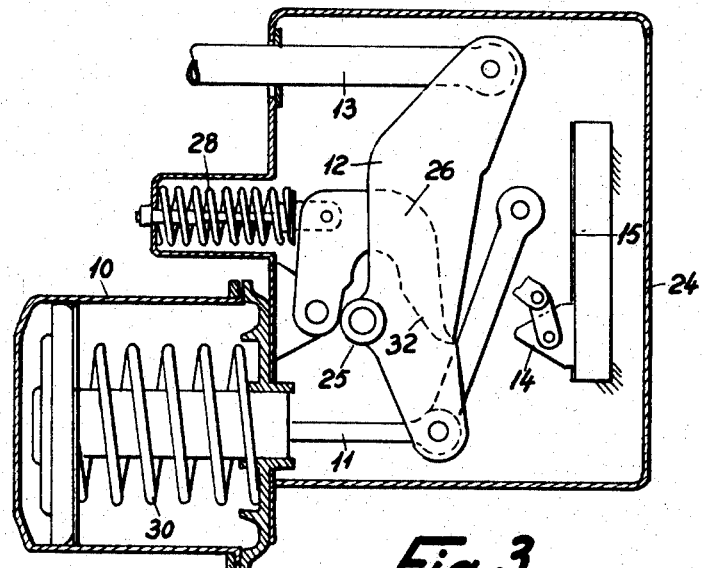
FIGURE 3 is a view corresponding to FIG. 2 but with the parts as at the end of a brake releasing operation without a return force from the linkage outside the housing.

FIG. 3 shows the positions of the elements in an apparatus like that of FIG. 2 after the brakes have been released again. However, in FIG. 3 it is assumed that the spring 8 of FIG. 1 is not active and thus the return of the parts is effected only by the return spring 30. Consequently, the push rod 13 will remain nearly stationary and the lower end of the lever 12 will turn to the position shown in FIG. 3. Thus, with a linkage as illustrated in FIG. 1 and a device as illustrated in FIGS. 2 and 3 if the spring 8 or its equavalent is rendered inoperative or omitted the lever 12 does not return to its normal rest position and the brakes may remain partially applied after the spring 30 has returned the piston and piston rod 11 to the position shown in FIG. 3. In other words, when the brakes are released the lever 12 for its return to its normal rest position requires a return force to be exerted upon it from the spring 8 and the linkage including the push rod 13 outside the housing 24.

Figure 4:
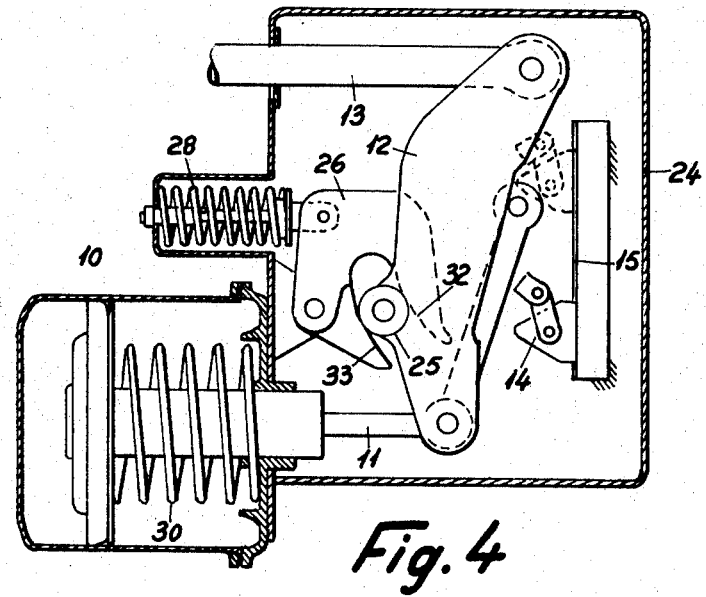
FIG. 4 is a view corresponding to FIG. 2 but showing a device in accordance with the invention with the parts at the same stage as in FIG. 2 and without a return force from the linkage outside the housing.

In the device in accordance with the invention as illustrated in FIG. 4, however, the cam 26 is arranged to act so that when the brakes are released the lever 12 returns to its normal rest position without requiring a return force to be exerted upon the lever 12 from the linkage outside the housing 24. This is achieved by providing the cam 26 with an additional surface 33 on which the cam follower 25 moves during the release of the brakes to cause the return of the lever 12 to its rest position. The force for the return of the lever 12 and of the linkage to the position for full release of the brakes is derived solely from the return spring 30, and the spring 8 or its equivalent can be omitted from the linkage. The said surface 33 as illustrated is substantially parallel to that surface 32 of the cam 26 on which the cam follower 25 moves during application of the brakes. The two said surfaces 33 and 32 as shown form opposite sides of a slot in the cam 26, the slot extending generally in a direction obliquely transverse to the general directions of movements of the ends of the lever 12. The general direction of movement of the upper end of the lever 12 is along the axis of the rod 13, the general direction of movement of its lower end is more or less horizontal in an arc determined by the link 29, and the general direction in which the slot extends is obliquely upwards.

I claim:

1. A device for varying the leverage in a vehicle brake linkage in dependence upon variations in the vehicle load, a lever movable within the housing, a cam mounted within the housing, a cam follower mounted on said lever for engaging said cam, and a fulcrum movable along a guide in the housing in dependence upon variations in the vehicle load, the arrangement being such that during an initial stage in the application of the brakes the lever rocks about an axis determined by the cam follower in engagement with the cam surface of the cam whereas during a final stage in the application of the brakes the lever rocks upon the said fulcrum, wherein the improvement resides in the fact that the cam is provided with an additional cam surface in a position to be engaged by the cam follower during the release of the brakes to cause the return of the lever to its rest position.

2. A device as in claim 1, wherein said cam surface is substantially parallel to the cam surface engaged by the cam follower during the initial stage in the application of the brakes.

3. A device as in claim 2, wherein the two said surfaces form opposite sides of a slot in the cam, the slot extending generally in a direction obliquely transverse to the general directions of movement of the ends of the lever.

References Cited

UNITED STATES PATENTS 2,384,257   9/1945   Nilsson _____ 188—195 X

FOREIGN PATENTS 255,571   11/1964   Australia.

DUANE A. REGER, *Primary Examiner.*